(12) United States Patent
Tamor et al.

(10) Patent No.: US 8,005,587 B2
(45) Date of Patent: Aug. 23, 2011

(54) METHOD AND SYSTEM FOR CONTROLLING A MOTIVE POWER SYSTEM OF AN AUTOMOTIVE VEHICLE

(75) Inventors: Michael Alan Tamor, Toledo, OH (US); Krishnaswamy Venkatesh Prasad, Ann Arbor, MI (US); Craig H. Stephan, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 687 days.

(21) Appl. No.: 12/019,721

(22) Filed: Jan. 25, 2008

(65) Prior Publication Data
US 2009/0192660 A1    Jul. 30, 2009

(51) Int. Cl.
*G05D 3/00*    (2006.01)
(52) U.S. Cl. .................... 701/22; 903/917; 180/65.27
(58) Field of Classification Search ................ 701/22, 701/123, 204; 903/917; 180/65.26, 65.27; 290/40 C, 40 D
See application file for complete search history.

(56) References Cited

U.S. PATENT DOCUMENTS

| | | | |
|---|---|---|---|
| 6,314,347 B1 | 11/2001 | Kuroda et al. | |
| 6,470,983 B1 | 10/2002 | Amano et al. | |
| 6,483,198 B2 | 11/2002 | Schmitz et al. | |
| 6,487,477 B1 | 11/2002 | Woestman et al. | |
| 6,553,308 B1 | 4/2003 | Uhlmann et al. | |
| 6,573,675 B2 | 6/2003 | Schmitz et al. | |
| 6,687,581 B2 | 2/2004 | Deguchi et al. | |
| 6,687,607 B2 | 2/2004 | Graf et al. | |
| 6,697,717 B2 | 2/2004 | Shioda et al. | |
| 2002/0188387 A1 | 12/2002 | Woestman et al. | |
| 2004/0030471 A1 | 2/2004 | Faye | |
| 2007/0208467 A1* | 9/2007 | Maguire et al. ........ | 701/22 |
| 2008/0027639 A1* | 1/2008 | Tryon ............... | 701/209 |

* cited by examiner

*Primary Examiner* — Gertrude Arthur Jeanglaud
(74) *Attorney, Agent, or Firm* — David B. Kelley; Brooks Kushman P.C.

(57) ABSTRACT

Environment conditions expected to be encountered by a vehicle are used as inputs in determining operating modes of a motive power system of a plug-in hybrid electric vehicle. A vehicle operating in charge depleting mode may transition to operate in charge sustaining mode if the vehicle is expected to encounter circumstances where it is desirable to allow the vehicle to more quickly respond to sudden requests for torque.

20 Claims, 4 Drawing Sheets

METHOD AND SYSTEM FOR CONTROLLING A MOTIVE POWER SYSTEM OF AN AUTOMOTIVE VEHICLE

BACKGROUND

1. Field of the Invention

The invention relates to methods and systems for controlling motive power systems of automotive vehicles.

2. Discussion

Plug-in hybrid-electric vehicles may be equipped with internal combustion engines and batteries of significant energy storage capacity. Such vehicles may be operated to maximize use of this stored energy capacity. As an example, a battery may exclusively supply power to move a vehicle.

Batteries of plug-in hybrid-electric vehicles may be charged from conventional electrical sources. As an example, such vehicles may be plugged in to a residential electrical outlet.

SUMMARY

Embodiments of the invention may take the form of a method or system for controlling a motive power system of an automotive vehicle. The method includes determining an expected location of the vehicle and determining expected environment information based on the expected location of the vehicle. The method also includes requesting the charge sustaining mode if the expected environment information meets a first predetermined criterion. The system includes at least one controller configured to implement the method described above.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Embodiments of the invention may provide for the use of navigation information in determining battery use strategy. As an example, if the vehicle is on a road with a low speed limit, the vehicle may operate in a battery charge depleting mode. If the vehicle approaches a road with a high speed limit, the vehicle may transition to operate in a battery charge sustaining mode. Similarly, if the vehicle approaches a sufficiently steep grade, the vehicle may transition to operate in the charge sustaining mode. If instead the vehicle is expected to enter a quiet or emission-free zone, e.g., hospital zone, residential area, the vehicle may continue to operate in the charge depleting mode. The charge depleting mode may be discontinued if, for example, the state of charge of the battery falls below a threshold. This threshold may be lower in quiet zones as compared to non-quite zones.

As another example, if the vehicle is on a road with a high speed limit, the vehicle may operate in the charge sustaining mode. If the vehicle approaches a road with a low speed limit, the vehicle may continue to operate in the charge sustaining mode as the probability of turning onto a road with a low speed limit may be low.

Figure 1:
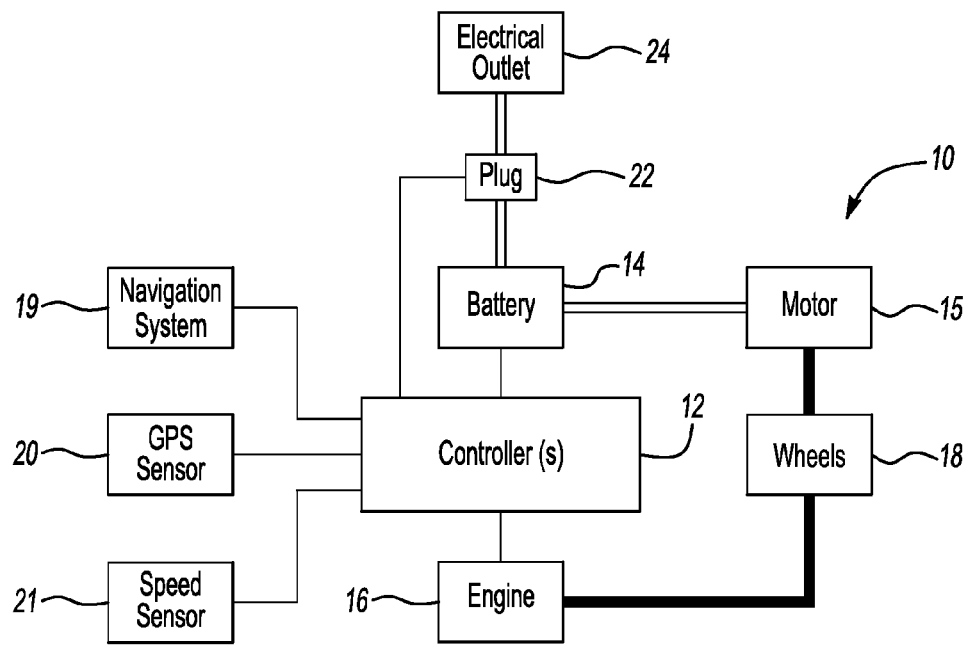
FIG. 1 is a schematic diagram of an exemplary plug-in hybrid electric vehicle.

FIG. 1 is a schematic diagram of an exemplary plug-in hybrid electric vehicle 10. In the embodiment of FIG. 1, the vehicle 10 includes a controller(s) 12, e.g., battery control module, engine control unit, vehicle control module, etc., battery 14, motor 15, engine 16, and wheels 18. The vehicle 10 also includes a navigation system 19, Global Positioning Satellite (GPS) sensor 20, and speed sensor 21. The vehicle 10 further includes a plug 22 electrically connected with the battery 14. In alternative embodiments, some of the elements above, e.g., the speed sensor 21, etc., may be absent.

The navigation system 19 provides information about the surroundings of the vehicle 10. For example, the navigation system 19 may provide coordinates, road type, road grade, and speed limit information for roads in the vicinity of the vehicle 10. The navigation system 19 may also provide coordinates and information regarding buildings, e.g., residential housing, hospitals, libraries, etc., in the vicinity of the vehicle 10. The navigation system 19 may thus provide any information generally available in typical navigation systems.

In the embodiment of FIG. 1, the battery 14 stores energy and provides electrical power, as indicated by double line, to the motor 15. The motor 15 converts this electrical power to mechanical power, as indicated by heavy line, to move the wheels 18. The battery 14 may be charged with electrical power, as indicated by double line, received from an electrical outlet 24. The engine 16 provides mechanical power, as indicated by heavy line, to move the vehicle 10 via the wheels 18. The battery 14, engine 16, or both may provide power to move the wheels 18.

The battery 14 and engine 16 are controlled by the controller(s) 12 in the instant example. The controller(s) 12, which may include a microprocessor, communicates with the battery 14, engine 16, GPS sensor 20, speed sensor 21, and plug 22 via a controller area network (CAN) as indicated by single line. In alternative embodiments, the controller(s) 12 may be one or more controllers organized to collectively implement the methods described herein and may communicate via hard wire, wireless, or any combination thereof. As explained below, the controller(s) 12 may control the battery 14 and engine 16 based on operating parameters of the vehicle 10, the current location of the vehicle 10, and the expected location of the vehicle 10.

Figure 2:
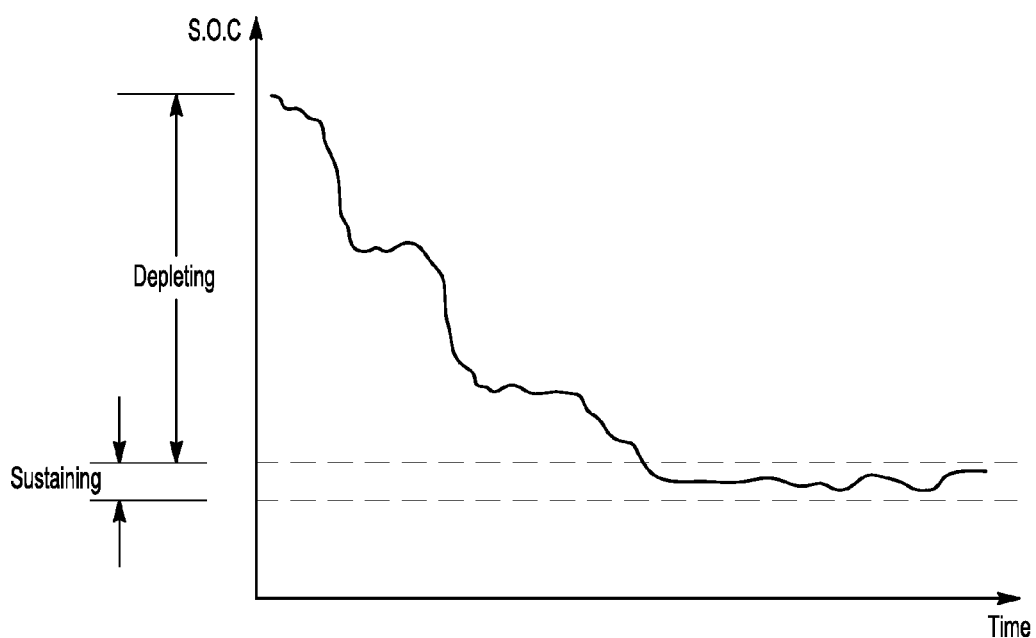
FIG. 2 is an exemplary plot of state of charge versus time of a battery of a plug-in hybrid electric vehicle.

FIG. 2 is an exemplary plot of state of charge versus time of a battery of a plug-in hybrid electric vehicle. The battery of a plug-in hybrid electric vehicle may experience periods of charge depleting and charge sustaining. The power threshold for engine start may be lower during charge sustaining as compared to charge depleting. For example, the engine start threshold may be 10 kw during charge sustaining and 30 kw during charge depleting. The engine, therefore, may turn on more frequently during charge sustaining as compared to charge depleting. As a result, operating the vehicle in charge depleting mode may increase fuel economy whereas operating the vehicle in charge sustaining mode may allow the vehicle to more quickly respond to sudden requests for torque.

Figure 3:
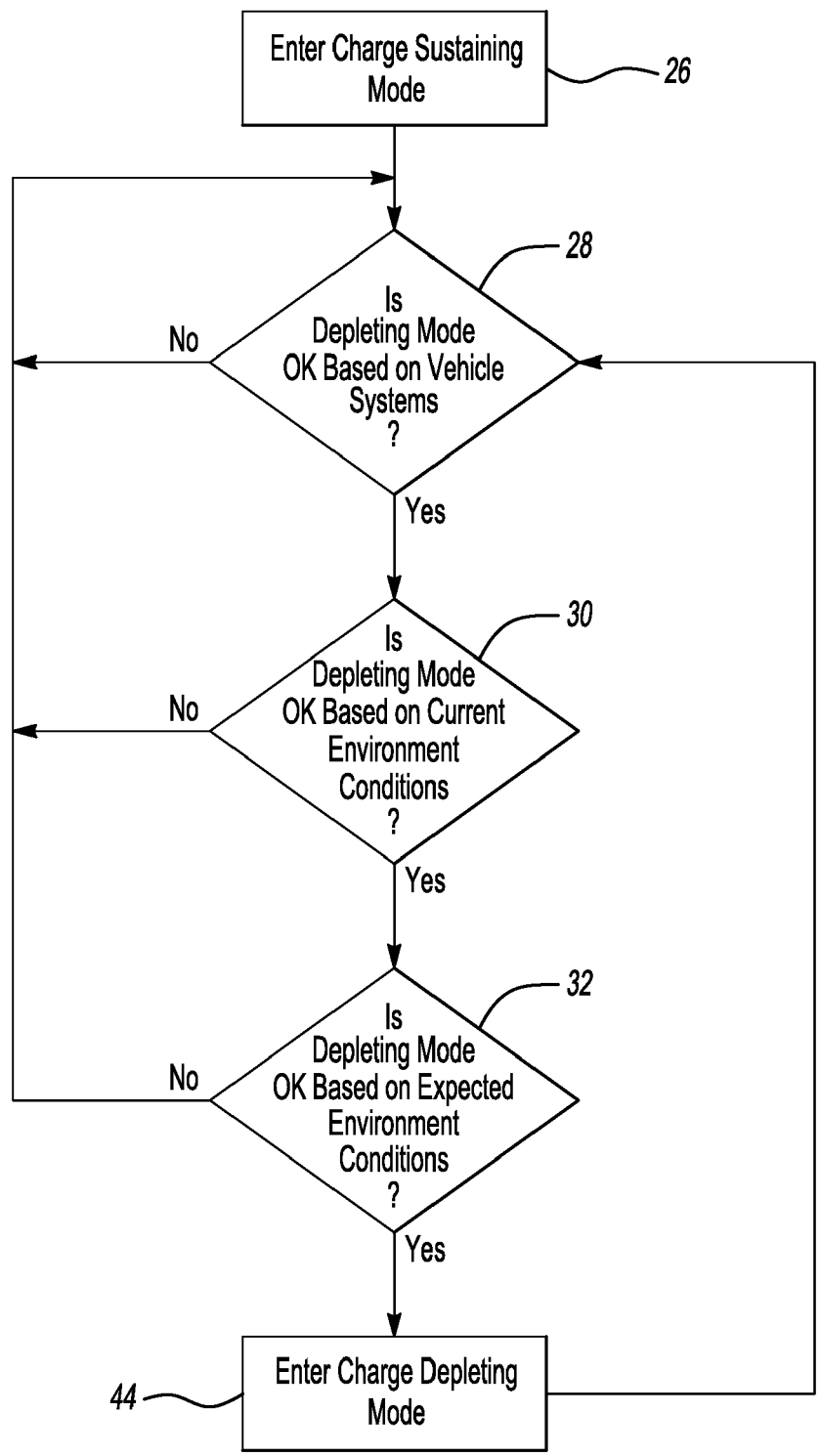
FIG. 3 is a flow chart of an exemplary method for controlling a battery.

FIG. 3 is a flow chart of an exemplary method for controlling a battery. At step 26, the charge sustaining mode is entered. For example, at vehicle start-up, the charge sustaining mode may be entered as a default. As such, the engine may or may not be on.

At step 28, vehicle systems are checked to determine whether the charge depleting mode may be entered. If no, the strategy returns to step 28. If yes, a request for charge depleting mode is made, e.g., a battery control flag is set to one, and the strategy proceeds to step 30. For example, if the state of charge of the battery 14 is below 40% (see FIG. 2), a request for charge depleting mode is not made.

At step 30, current environment conditions are checked to determine whether the charge depleting mode may be entered. If no, the strategy returns to step 28. If yes, a request for charge depleting mode is made and the strategy proceeds to step 32.

For example, the navigation system 19 and GPS sensor 20 provide current vehicle location, e.g., coordinate data, as well as current road type information, e.g., unimproved, which is based on the current vehicle location. Other environmental information, e.g., population density, etc., may also be provided based on the current vehicle location. In the instant example, a look-up table in controller memory, e.g., Table 1, is inspected to determine whether the charge depleting mode is appropriate based on the current environment conditions, e.g., road type information.

TABLE 1

| Road Type | Suggested Mode |
|---|---|
| Unimproved | Depleting |
| Paved | Depleting |
| Highway | Sustaining |

An inspection of Table 1 reveals that for an unimproved road, depleting mode is suggested. Under such circumstances, a request for charge depleting mode may be made.

At step 32, expected environment conditions, e.g., expected road conditions, are checked to determine whether the charge depleting mode may be entered. If no, the strategy returns to step 28. If yes, a request for charge depleting mode is made and the strategy proceeds to step 44.

Figure 4:
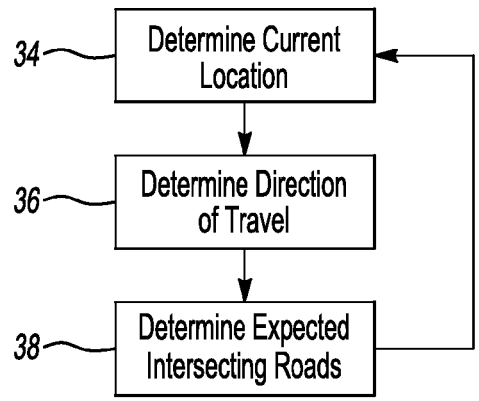
FIG. 4 is a flow chart of an exemplary method for determining road conditions.

FIG. 4 is a flow chart, stored in memory, of an exemplary method for determining expected road conditions. This and similar methods may be used to determine other expected environment conditions, e.g., quiet zones, etc. At step 34, the current location of the vehicle 10 is determined. At step 36, the direction of travel of the vehicle 10 is determined. At step 38, the expected intersecting roads are determined.

Figure 5:
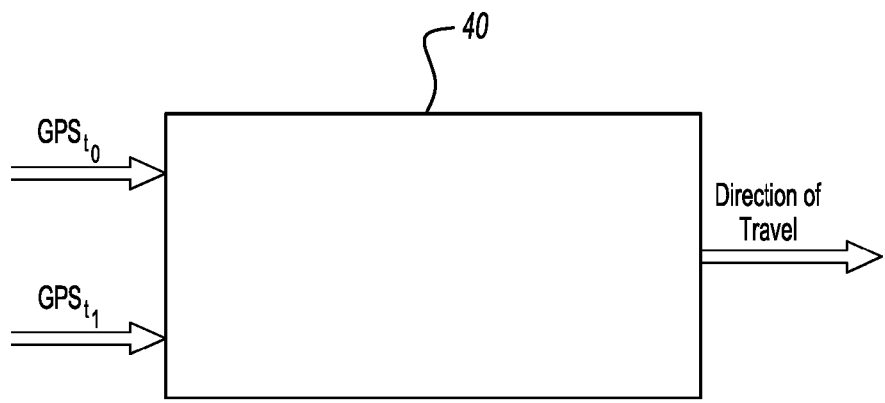
FIG. 5 is a schematic diagram of an exemplary control block implemented by the controller of FIG. 1.

FIG. 5 is a schematic diagram of an exemplary control block 40 implemented by the controller 12. GPS coordinates at time $t_0$ and $t_1$ from the GPS sensor 20 are input to the control block 40. The control block 40 uses this position and time data to calculate a velocity vector by, for example, evaluating the change in position versus the change in time. For example, using a standard x-y coordinate system, if the location of the vehicle 10 at time $t_0$ is (0, 0) and the location of the vehicle 10 at time $t_1$ is (1, 1), the travel is in the (1, 1) direction. This, or other, calculations may be performed, for example, every 100 milliseconds.

Figure 6:
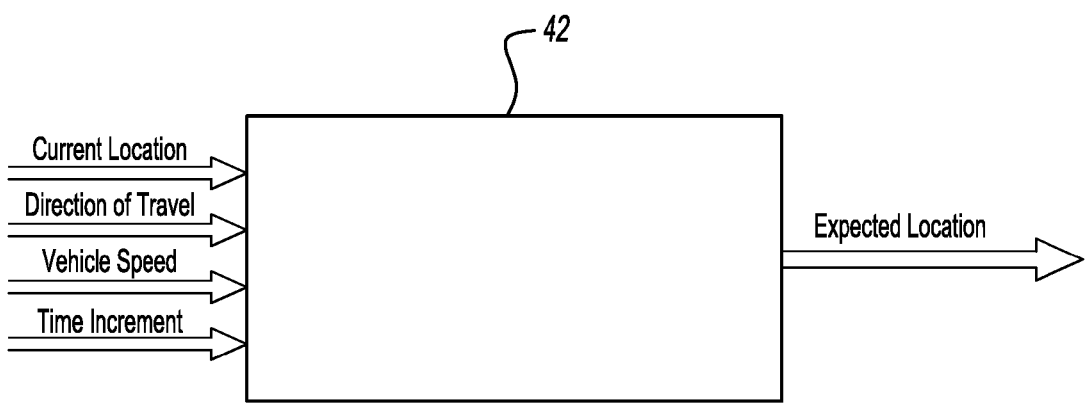
FIG. 6 is another schematic diagram of an exemplary control block implemented by the controller of FIG. 1.

FIG. 6 is a schematic diagram of an exemplary control block 42 implemented by the controller 12. The current location, direction of travel, and vehicle speed from the speed sensor 21 are input to the control block 42. A time increment, e.g., 5 seconds, is also input to the control block 42. Given these inputs, the control block 42 is able to predict the expected location of the vehicle 10 after the time increment has passed. For example, using a standard x-y coordinate system, if the current location of the vehicle 10 is (1, 1), the direction of travel is in the (1, 0) direction, the vehicle speed is 1 unit per second, and the time increment is 5 seconds, the expected location of vehicle 10 is (6, 1) after the time increment has passed.

Referring to FIG. 3, at step 44, flags from steps 28, 30, 32 have been set, for example, and the charge depleting mode is entered. The strategy then returns to step 28 and repeats the process. If during this process any one of the outcomes of steps 28, 30, 32 is no, the charge sustaining mode is entered. In other examples, the charge sustaining mode may be entered if the outcome of any two of the steps 28, 30, 32 is no. Other strategies are also possible.

Figure 7:
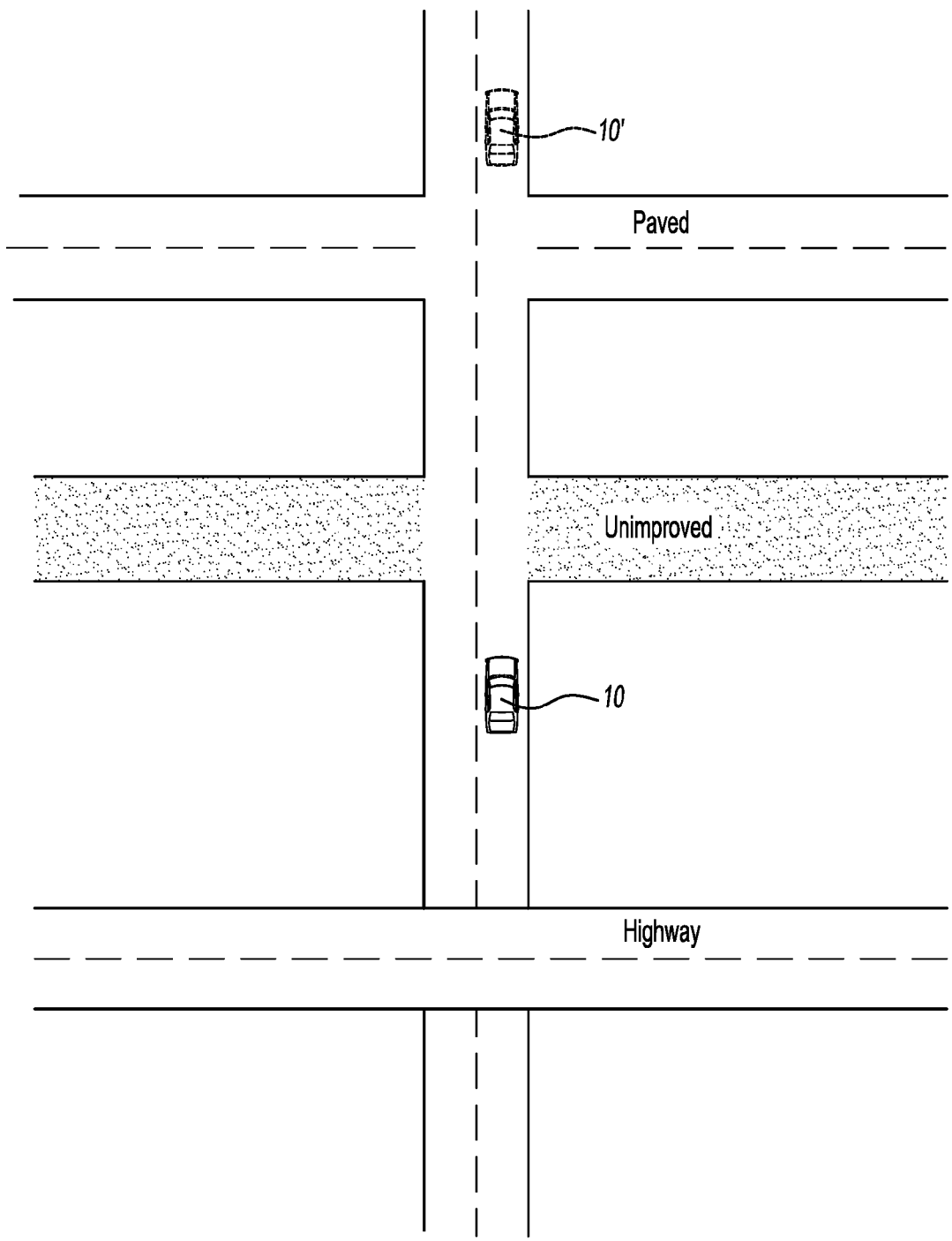
FIG. 7 is a schematic diagram of exemplary current and expected locations of the vehicle of FIG. 1.

FIG. 7 is a schematic diagram of an exemplary current location of the vehicle 10 and expected location of the vehicle 10'. In the example of FIG. 7, information from the navigation system 19, e.g., geographic coordinate data of roads and geographic coordinate data associated with the trajectory of the vehicle 10, indicates that there are three intersecting roads in the vicinity of the vehicle 10, and that two of the intersecting roads may be encountered during the time increment. In the example of FIG. 7, a look-up table, e.g., Table 1, is inspected to determine whether the charge depleting mode is appropriate based on the expected intersecting road type information. In this example, the vehicle 10 is expected to encounter an unimproved road and a paved road. As such, Table 1 suggests that charge depleting mode is appropriate and therefore a request for charge depleting mode is made. If, instead, the vehicle 10 is expected to encounter an unimproved road and a highway, the control strategy may be biased in favor of charge sustaining mode such that a request for charge sustaining mode is made.

A process similar to that described with reference to FIG. 7 may be used to determine, for example, whether the vehicle 10 may be in the vicinity of a hospital after a time increment, e.g., 7 seconds, has passed. For example, geographic coordinate data for an area within a radius, e.g., 100 meters, of the expected location of the vehicle 10 may be checked for the presence of hospitals. If a hospital falls within the radius, a request for charge depleting mode may be made.

If multiple criteria, e.g., road type, grade, and zone information, are used to evaluate the expected environment, as described above, the control strategy may be biased in favor of charge sustaining mode such that if any one criterion suggests charge sustaining mode, a request for charge sustaining mode may be made, e.g., a battery control flag is set to zero. Alternatively, the control strategy may also be biased in favor of charge sustaining mode such that if a predetermined number of criteria, e.g., two, suggest charge sustaining mode, a request for charge sustaining mode may be made. Other strategies are also possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for controlling a motive power system of an automotive vehicle wherein the motive power system has a charge sustaining mode and a charge depleting mode, the method comprising:

determining an expected location of the vehicle;

determining expected environment information based on the expected location of the vehicle; and requesting the charge sustaining mode if the expected environment information meets a first predetermined criterion, thereby controlling the motive power system.

2. The method of claim 1 further comprising determining a current location of the vehicle and wherein the expected location of the vehicle is based on the current location.

3. The method of claim 1 wherein determining an expected location of the vehicle includes determining a direction of travel of the vehicle.

4. The method of claim 1 further comprising requesting the charge depleting mode if the expected environment information meets a second predetermined criterion, thereby controlling the motive power system.

5. The method of claim 2 wherein determining a current location of the vehicle includes determining geographic coordinates of the vehicle.

6. The method of claim 5 wherein the geographic coordinates comprise global positioning satellite coordinates.

7. The method of claim 1 further comprising evaluating an operating parameter of the vehicle and requesting the charge sustaining mode if the operating parameter meets a second predetermined criterion.

8. The method of claim 7 further comprising requesting the charge depleting mode if the operating parameter meets a third predetermined criterion.

9. The method of claim 2 further comprising determining current environment conditions based on the current location of the vehicle and requesting the charge sustaining mode if the current environment conditions meet a second predetermined criterion.

10. The method of claim 9 wherein the current environment conditions comprise at least one of road type, speed limit, road grade, and proximate buildings.

11. The method of claim 9 further comprising requesting the charge depleting mode if the current environment conditions meet a third predetermined criterion.

12. The method of claim 1 wherein the expected environment information comprises at least one of road type, speed limit, road grade, and proximate buildings.

13. A system for controlling a motive power system of an automotive vehicle wherein the motive power system has a charge sustaining mode and a charge depleting mode, the system comprising:

at least one controller configured to determine an expected location of the vehicle, to determine expected environment information based on the expected location of the vehicle, and to request the charge sustaining mode if the expected environment information meets a first predetermined criterion, thereby controlling the motive power system.

14. The system of claim 13 wherein the at least one controller is further configured to determine a current location of the vehicle and wherein the expected location of the vehicle is based on the current location.

15. The system of claim 13 wherein the at least one controller is further configured to determine a direction of travel of the vehicle when determining an expected location of the vehicle.

16. The system of claim 13 wherein the at least one controller is further configured to request the charge depleting mode if the expected environment information meets a second predetermined criterion, thereby controlling the motive power system.

17. The system of claim 13 wherein the at least one controller is further configured to evaluate an operating parameter of the vehicle and request the charge sustaining mode if the operating parameter meets a second predetermined criterion.

18. The system of claim 17 wherein the at least one controller is further configured to request the charge depleting mode if the operating parameter meets a third predetermined criterion.

19. The system of claim 14 wherein the at least one controller is further configured to determine current environment conditions based on the current location of the vehicle and request the charge sustaining mode if the current environment conditions meet a second predetermined criterion.

20. The system of claim 19 wherein the at least one controller is further configured to request the charge depleting mode if the current environment conditions meet a third predetermined criterion.

* * * * *